(No Model.)　　　　　　J. N. WILLIAMS.　　　　8 Sheets—Sheet 1.
TYPE WRITING MACHINE.
No. 501,753.　　　　　　　　　　Patented July 18, 1893.
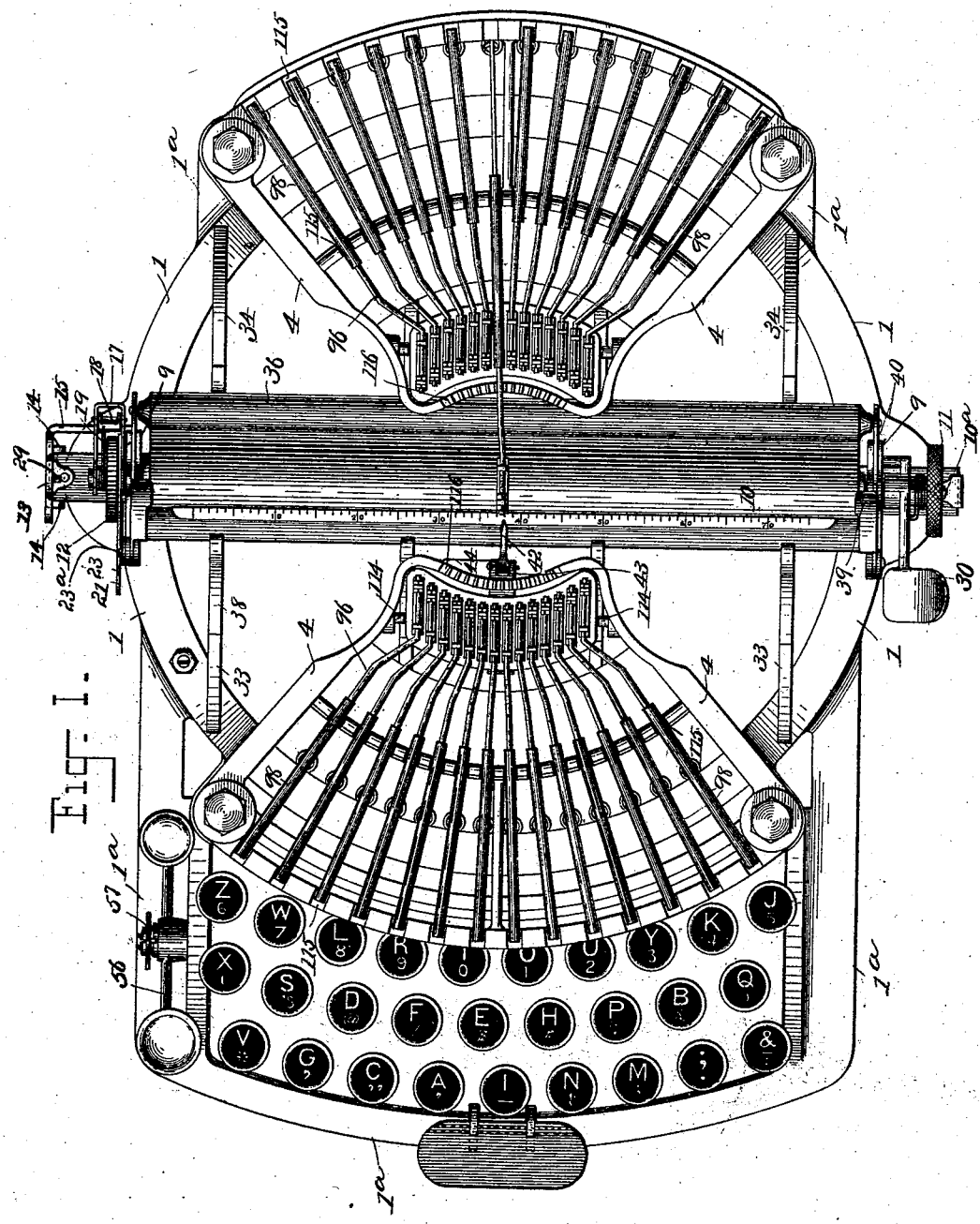
Witnesses.
John F. Nelson.
Mazie V. Bidgood.
Inventor.
John Newton Williams
By [signature]
Attys

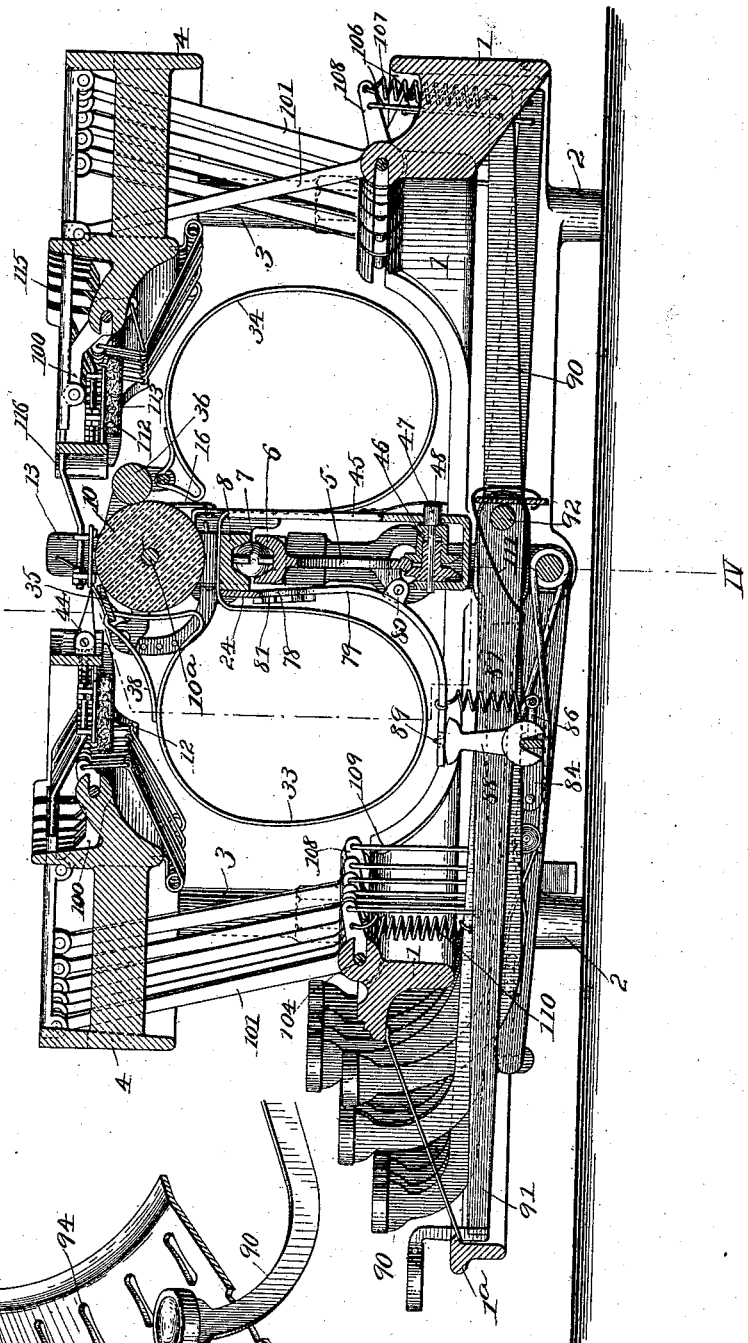

(No Model.)
J. N. WILLIAMS.
TYPE WRITING MACHINE.
No. 501,753. Patented July 18, 1893.
Fig. IV.
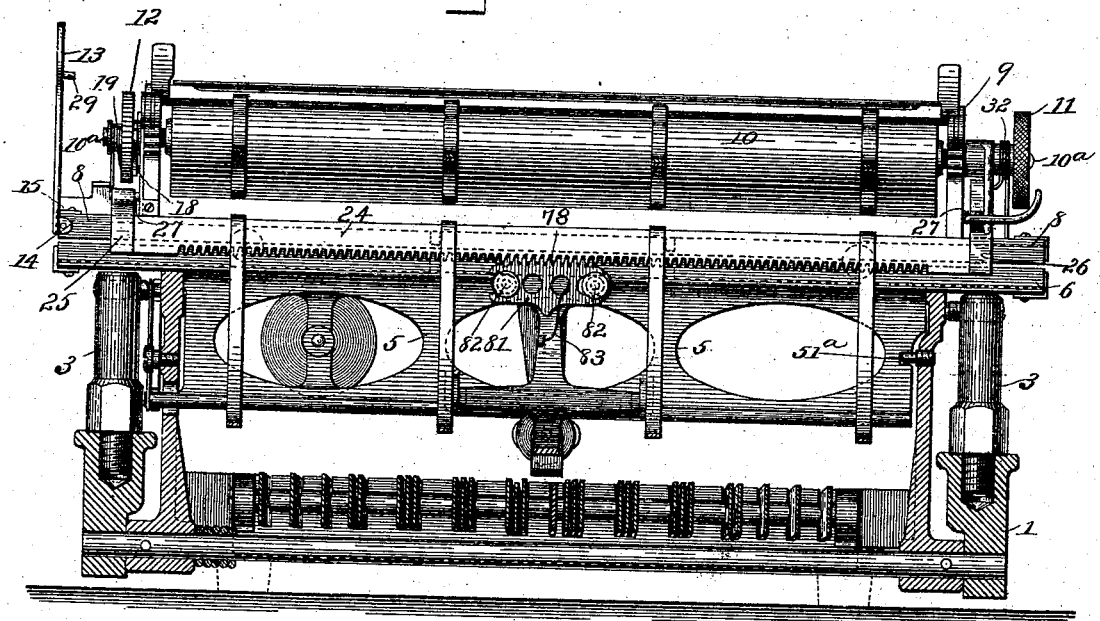
Fig. V.
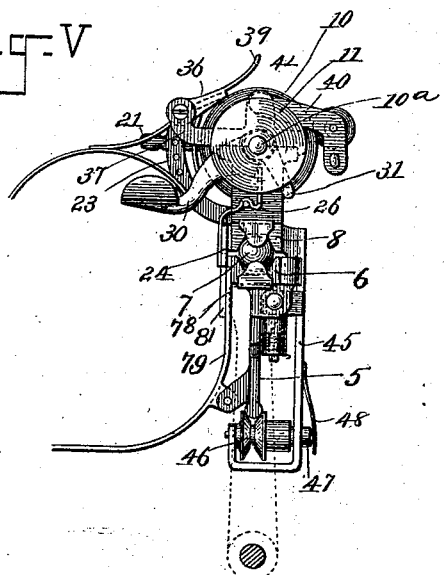
Witnesses.
John F. Nelson.
Mazie V. Bidgood.
Inventor.
John Newton Williams
By Knight Bros
Attys

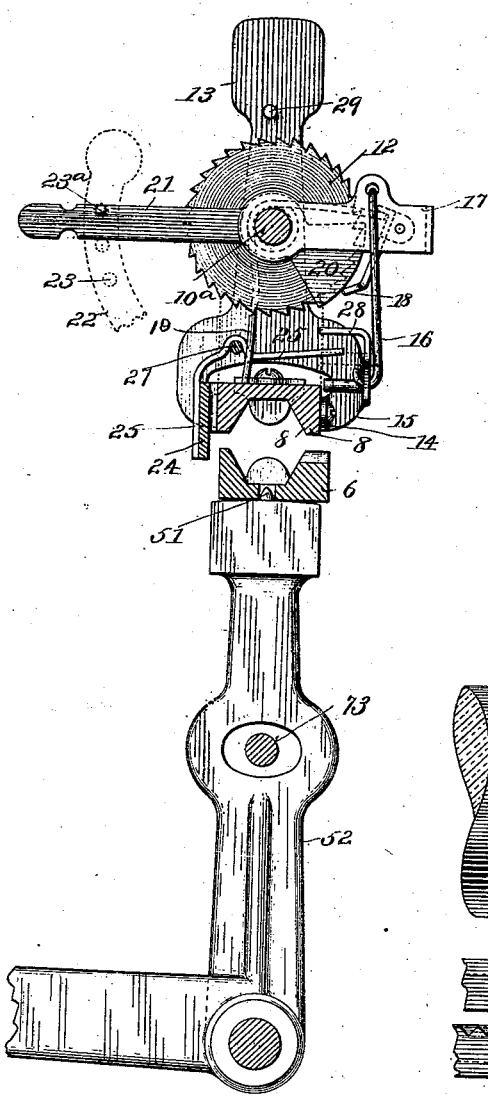
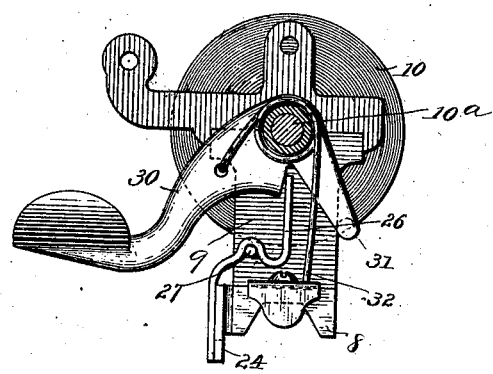
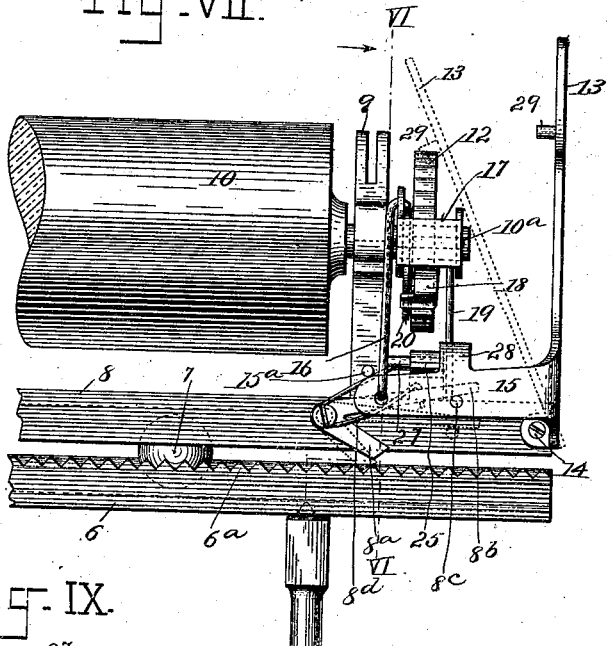
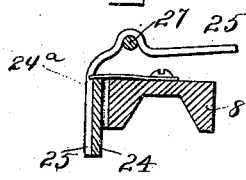

(No Model.) 8 Sheets—Sheet 5.
J. N. WILLIAMS.
TYPE WRITING MACHINE.
No. 501,753. Patented July 18, 1893.
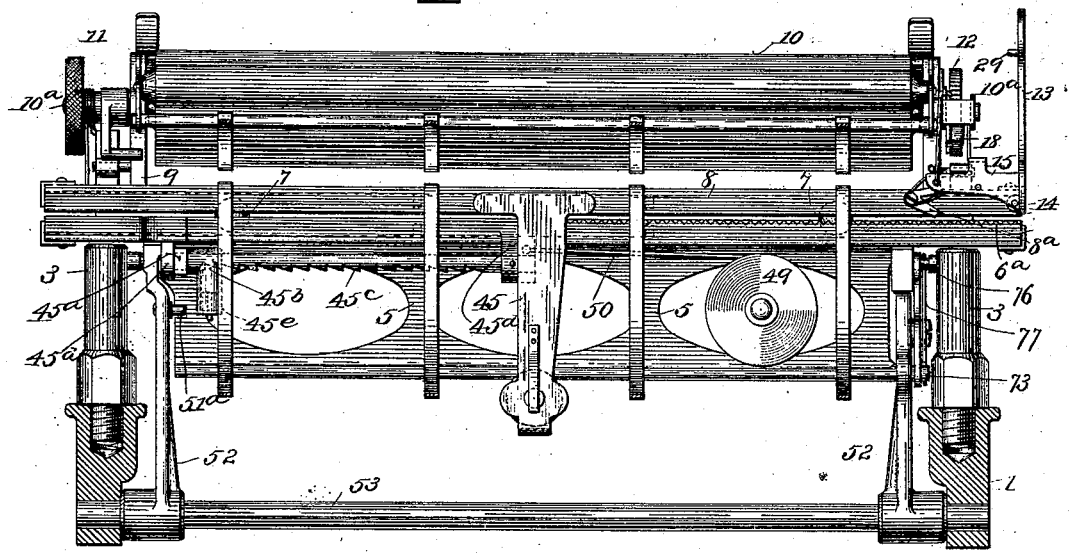
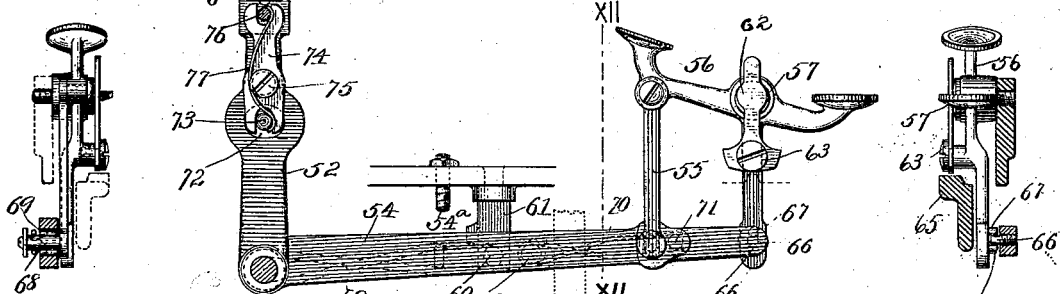
Witnesses.
John F. Nelson
Mazie L. Bidgood
Inventor.
John Newton Williams
By Knight Bro's
Att'ys (No Model.)  8 Sheets—Sheet. 6.
J. N. WILLIAMS.
TYPE WRITING MACHINE.
No. 501,753.  Patented July 18, 1893.
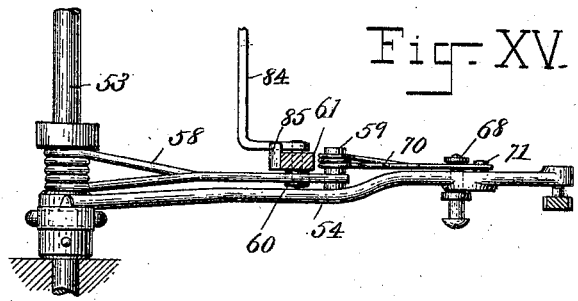
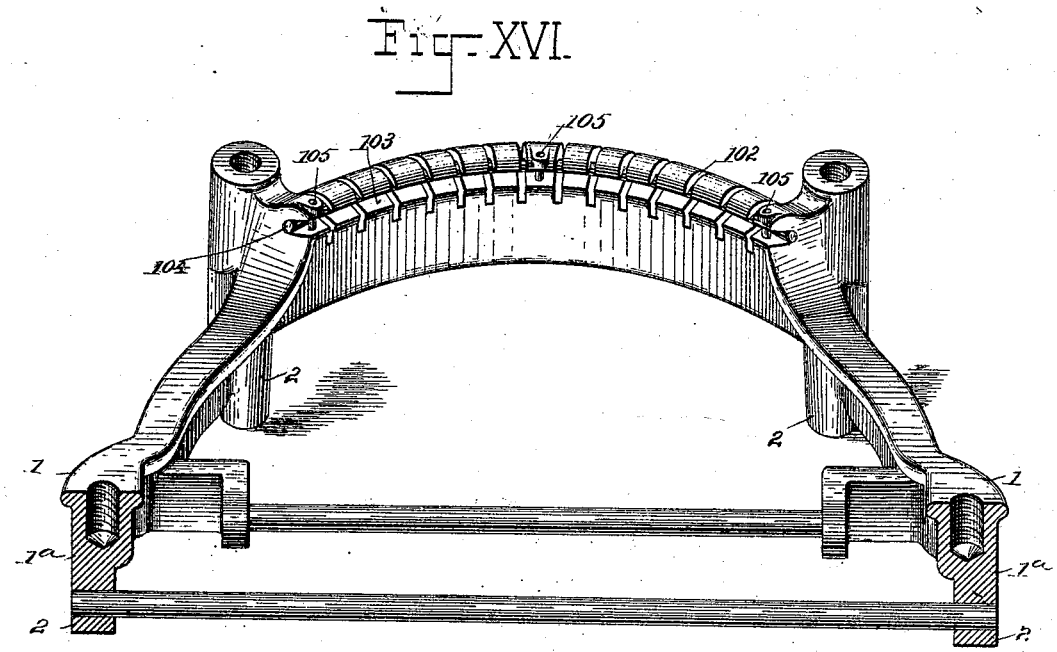
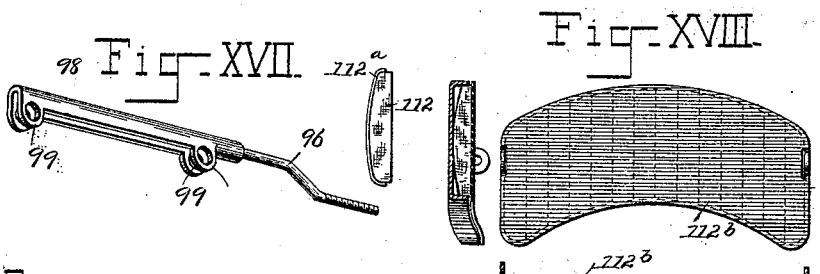
Witnesses.
John F Nelson.
Mazie V. Bidgood.
Inventor.
John Newton Williams
By Knight Bros
Attys

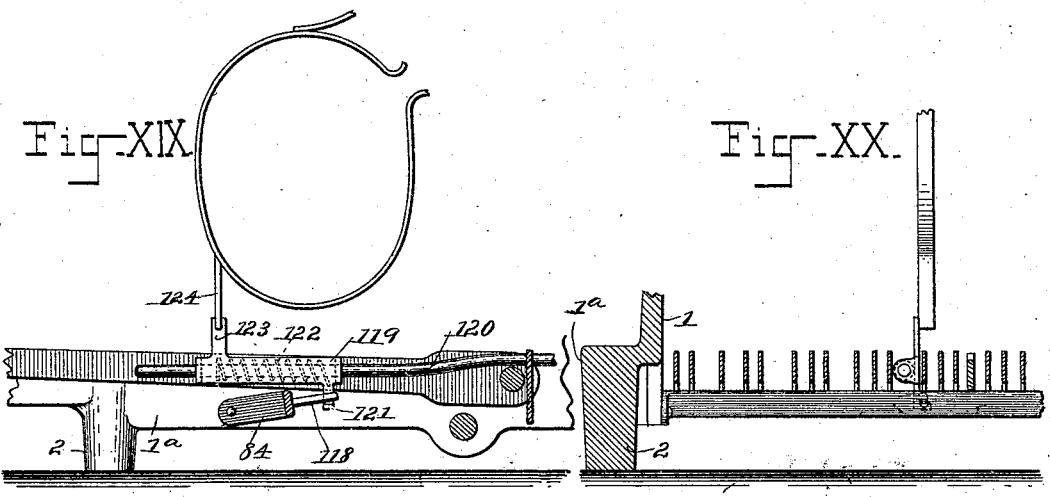

(No Model.)
J. N. WILLIAMS.
TYPE WRITING MACHINE.
No. 501,753.　　　　　　　　　Patented July 18, 1893.
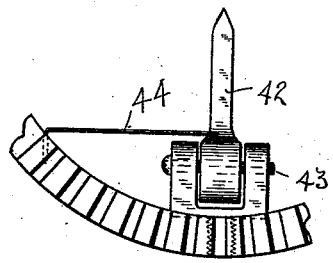
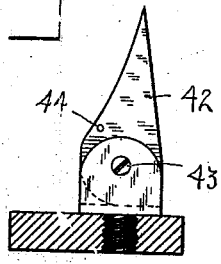
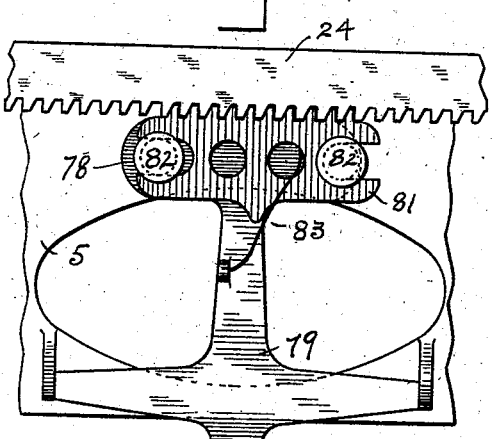
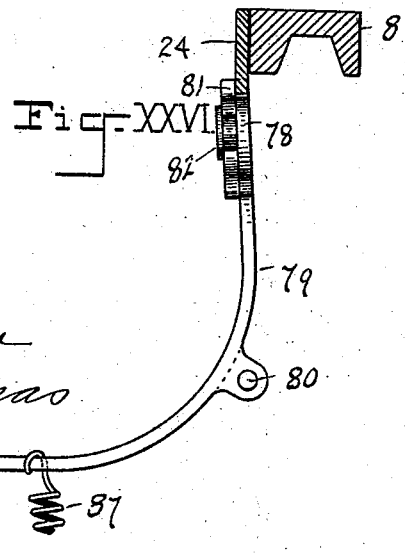
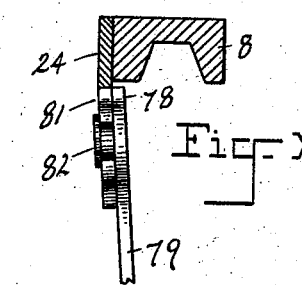
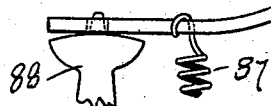
8 Sheets—Sheet 8.

UNITED STATES PATENT OFFICE.

JOHN N. WILLIAMS, OF BROOKLYN, NEW YORK.

TYPE-WRITING MACHINE.

SPECIFICATION forming part of Letters Patent No. 501,753, dated July 18, 1893.

Application filed November 20, 1890. Serial No. 372,119. (No model.)

*To all whom it may concern:*

Be it known that I, JOHN NEWTON WILLIAMS, a citizen of the United States, residing at Brooklyn, county of Kings, State of New York, have invented certain new and useful Improvements in Type-Writing Machines, of which the following is a specification.

The accompanying drawings illustrate a typewriting machine embodying my improvements and I will first fully describe the said machine and then point out in the claims the novel parts and combinations.

In said drawings: Figure I is a plan view of the machine. For the sake of clearness of the drawings, many of the lower lying portions of the machine are omitted. Fig. II is a sectional elevation of the machine, the plane of section being taken midway of the machine from front to rear. Fig. III is a detached view of a portion of the key board, illustrating the method of guiding the front ends of the key levers. Fig. IV is a transverse sectional elevation of the machine on the plane indicated by the broken line IV—IV, Fig. II. Fig V is an end view of the right hand end of the paper carriage and adjacent parts. Fig. VI is an enlarged sectional view of the left end of the paper carriage and associated parts—taken on the line VI—VI, Fig. VII. Fig. VII is a similarly enlarged rear elevation of said end of the paper carriage. Fig. VIII is a partly sectional end elevation of the other end of the paper carriage. Fig. IX is a sectional view of the long feed rack and carriage bar. Fig. X is a view similar to Fig. IV taken on the opposite side of the paper carriage. Fig. XI is an end view of the right hand end of the paper carriage and connected mechanism. Fig. XII is an edge view of the carriage shifting and locking devices taken on the plane indicated by the dotted lines XII—XII, Fig. XI. Fig. XIII is a front edge view of the same and Fig. XIV is a side view thereof. In the latter view the mechanism is shown at one extreme position. Fig. XV is a partially sectional top view of portions of the carriage shifting mechanism. Fig. XVI is a perspective view of a portion of the machine frame. Fig. XVII is a perspective view of a single type carriage. Fig. XVIII shows in under side view, longitudinal section and transverse section the ink pad and pan, as well as in side view, one of the pad-sections detached. Figs. XIX and XX are detail sectional views, taken in transverse vertical planes of portions of the machine, illustrating one form of mechanism for locking the key levers when the carriage approaches the end of its movement in printing a line. Figs. XXI and XXII show in plan and in sectional projection therefrom, the index, to a larger scale than in the previous views. Fig. XXIII is a detached view of a part of the tilting key mechanism for shifting the platen to illustrate the pin and slot connection hereinafter referred to. Figs. XXIV and XXV are rear elevations to an enlarged scale of the feed racks, showing the small racks in two positions. Figs. XXVI and XXVII are sectional views of the same mechanism.

The stationary frame of the machine has the base piece 1, 1ª supported on legs 2, and having posts 3 which carry the upper segmental frames 4, 4.

In the top view (Fig. I) the base piece of the frame is shown to have a circular part 1 which contains the bearings of the type-carrier-operating levers and a forward extension 1ª encircling the key board, while the upper segmental frames 4 are ranged one in front and one in rear of the paper carriage and serve as supports and guides for the type carriers.

The paper carriage is arranged diametrically of the circular portion 1 of the base frame and is mounted so as to run on a single rail. This rail 5 is made in the form of a girder and is of considerable depth as shown in Fig. IV, so as to be sufficiently stiff. Its upper edge is expanded laterally and lengthwise in the form of a bar or track 6 which is grooved on its upper surface as shown in Fig. V to receive anti-friction balls 7, 7. The groove is made of such shape and dimensions relatively to the balls 7 that the latter bear on the inclined faces of the groove without touching the bottom thereof so that the carriage may travel on said balls from side to side of the machine with a minimum of friction. The carriage has a bar 8 similar to the bar 6 of the track and similarly grooved to rest upon the said balls. This bar forms together with the two standards 9, 9 rising near its ends substantially the entire carriage frame. The rotary platen or paper roller 10 which may be of usual construction is journaled in these standards, its trunnions 10ª projecting through the standards and bearing rigid with them the wheels 11, 12 whereby the platen is rotated. The thumb wheel 11 at the right hand end is turned either way by the operator to feed the paper in either direction optionally. The wheel 12 is a ratchet wheel for feeding the platen automatically from line to line in writing. This operation is effected by the following mechanism: 13 is a lever, the shape of which can be best gained from Figs. VI and VII. It is pivoted at 14 to the carriage bar 8 and has an inwardly projecting arm 15. A link 16 at the end of arm 15 is joined to a U-shaped lever yoke 17 which embraces the ratchet wheel 12 and turns loosely on the platen trunnion 10ª. 18 is a pawl hinged in the U-yoke 17. 19 is a spring which bears under a lip of the pawl 18, encircles trunnion 10ª and is fixed at one end to bar 8 tending at the same time to keep the said pawl against the ratchet wheel and to retain the yoke 17 in a horizontal position. It is stopped at that position by pin 15ª on standard 9 which arrests arm 15. By pressing the lever 13 inward with the fingers of the left hand, the arm 15 is depressed, drawing down the link 16 and yoke 17 and the pawl 18, engaging with ratchet-wheel 12 rotates the same the width of a line spacing. When the lever 13 is released the spring 19 returns the parts to normal position shown in Figs. VI and VII. It is apparent that if the pawl be only brought into engagement with the ratchet wheel after the commencing of the inward movement of lever 13 the lever will commence to move inward without rotating the platen. This enables the use of the means shown for the regulation of the width of the line spacing and consisting of a cam 20 which has finger piece 21 and is pivoted on the platen trunnion 10ª. By the finger piece 21 the cam can be turned to locate at will the point at which the pawl in its downward movement will engage with the ratchet wheel to rotate it. A locking segment 22 has perforations 23 to receive a pin 23ª on the inner face of finger piece 21 so arresting it in any desired position.

In this machine, it is the intention that the return of the carriage into position to start a fresh line shall be performed by the left hand of the operator. I therefore provide means whereby this operation just described of the lever 13 will disconnect the step-by-step feed so that by continuing the inward pressure on the lever 13, it will be shifted with the carriage which supports it into position for beginning a new line.

24 is the long step-by step feed rack running from side to side of the machine and having at each end an arm 25, 16 whereby it is pivoted at 27, 27 on the standards 9, 9. The arm 25 is, as shown in Fig. VI, prolonged across the carriage bar 8 so as to project into the path of a finger 28 of lever arm 15. The depression of arm 15 when the lever 13 is pressed to the right brings the finger 28 into engagement with arm 25 and the rack 24 is thereby rotated around its pivots 27, 27 and disconnected from its escapement, and the operator by then continuing to press to the right on the lever 13 may throw the carriage to the right side of the machine for beginning a new line. A single movement therefore by the operator rotates the platen, disconnects the carriage from its escapement and moves the carriage into position for beginning a line of writing. On the lever 13 is a teat 29 which comes in contact with ratchet wheel 12 during this operation both to arrest the movement of the lever 13 and to positively stop the platen from further rotation while the carriage is being returned to the right side of the machine. When the carriage reaches a position at the right side of the machine the arm 45 of said carriage hereinafter described comes in contact with a rearward projecting stop 45ª (Fig. X). This stop has a sleeve 45ᵇ arranged to slide on a toothed bar 45ᶜ hung in lugs 45ᵈ of track 5. A spring bolt or pin 45ᵉ carried by sleeve 45ᵇ (shown dotted in Fig. X) engages the teeth of bar 45ᶜ to arrest the stop 45ª at any desired position. In this manner the width of line may be regulated. When the arm 45 strikes stop 45ª, the operator releases lever 13 allowing the long feed rack 24 to drop into engagement with its escapement and so hold the carriage in readiness for writing. To lock the carriage during the moment occupied in the dropping of the feed rack to vertical position, so that there may be no danger that the escapement will skip one or two teeth of the feed rack before arresting the carriage, I employ the mechanism shown in Fig. VII. The bar 6 is toothed on its rear upper edge as shown at 6ª. On bar 8 of the carriage is mounted a pawl 8ª which has, rigid with it a long arm 8ᵇ pressed down against a stop pin 8ᶜ on arm 15 by one end of spring 8ᵈ whose other end rests against pin 15ª. The spring 19 must be of such strength as to yield under the inertia of the carriage when lever 13 is pressed inward, but to overcome the action of spring 8ᵈ when lever 13 is released. When therefore the operator presses lever 13 inward, the pin 8ᶜ drops and as the arm 8ᵇ follows it under the action of spring 8ᵈ the pawl 8ª is brought down against teeth 6ª and will, when lever 13 is released, temporarily lock the carriage until it is lifted by pin 8ᶜ as the feed rack 24 comes into engagement with its escapement.

At the right-hand end of the platen also I provide means for enabling the carriage to be shifted from one side of the machine to the other. This operation involves the disconnection of the step-by-step escapement but not of the automatic line feed mechanism. The device consists of a thumb piece or lever 30 pivoted on the right hand platen trunnion and impinging when it is depressed on the rack arm 26 which projects up into its path. This movement dislodges the rack 24 from its escapement so that the operator by using the thumb piece can move the carriage freely from side to side of the machine. The arm 31 rigid with the lever 30 arrests the latter at both extremities of its movement by impinging on parts of the paper carriage frame and the spring 32 returns the lever to its normal position shown in Fig. V. The prompt return of rack 24 to engagement with its escapement is aided by spring 24$^a$ Fig. IX. The paper being written on is rolled by the operation of the platen 10 from the spring wire paper cage 33 (Fig. II) in front of the carriage into similar cage 34 in rear of the carriage, passing over the top of the platen whereon it is pressed in front by the bar 35, and at rear by the roller 36. The bar 35 has a scale on its upper surface (see Fig. I) whose graduations correspond to the teeth of the step-by-step feed. It is pivoted by arms 36, 36 at its ends to lugs 37 fixed to the standards 9, 9 and is held down on the platen by the spring wire cage 33, loops 38 of which engage with the bar. Finger pieces 39 on the arms 36 enable the bar to be turned around its pivots to a vertical position over the same in which position it is automatically held by the downward pull of the wire cage 33. This movement enables the paper to be slipped into the cage by the operator. The rear paper pressure roller 36 is hung on links 40 pivoted at 41 to the standards 9. 9. The wire cage 34 is hung from the same links which by their downward pull hold the rear pressure roller against the platen. The pressure of the pressure bar 35, and pressure roller 36 is sufficient to prevent accidental rotation of the platen.

The index 42 (see Figs. I, II, XXI and XXII) indicates the central point over the platen at which all impressions occur. It is hinged at 43 to the rear face of the front segment frame 4 and is pressed downward to a horizontal position by the spring 44. This construction enables the index to rise with the pressure bar 35 when the latter is raised to allow the paper to be inserted.

It will be seen that the paper carriage embracing the bar 8, platen 10, the two paper cages and the allied mechanism which I have just finished describing straddles the vertical rail or girder 5 and moves integrally from end to end of the same. The paper carriage is held on the girder by the means shown in Figs. II, V and X comprising a J-shaped pendent arm 45 fixed at its upper end to the bar 8 and a two-part double beveled telescoping wheel 46 supported upon said arm and engaging the lower edge of the rail 5. This wheel runs on a pintle 47 held in by spring 48 and co-operating with the two-part beveled wheel 46 as will be seen in Fig. II to securely hold the rail. This peculiar construction enables the parts to be readily assembled and also allows the mechanism when assembled to yield slightly so that the carriage will run with little friction. The constant automatic pressure, acting with the beveled surfaces of wheels 46 takes up all back lash and prevents loose motion. The carriage is supported on and guided by the grooved bars 6, 8 and balls,—the pendent arm 45 and wheel 46 serving simply as a means for steadying this movement and prevent its dislodgment. The carriage is pulled from right to left by a spring coiled in box 49 and connected to cord 50 which is attached to a pin on the arm 45. The carriage while running freely from left to right on the rail 5 will partake of the movement of that rail from front to rear. This movement takes place when it is desired to shift the platen to the front or rear of its normal position to bring another set of type of the type carriers into operation. The rail 5 by its enlarged top 6 rests on the upper ends of rocking levers 52, 52 carried by a rock shaft 53 which is journaled in diametrically opposite sides of the base frame 1. The teats 51 (Fig. VI) entering holes in bar 6 prevent its dislodgment. A pin 51$^a$ entering a socket in the end of rail 5 prevents the latter from lifting in its seat. The tops of levers 52 are curved in a circle struck from the levers' pivots, so that the levers can rock under the bar 6 maintaining the same in a horizontal plane. One of the levers 52 (see Fig. XI) has integral with it an arm 54 so that the two parts form a bell-crank-lever which projects forward toward the key board of the machine and is connected by a rod 55 with a rocking key 56 pivoted at 57 to the base frame. Depression of the rear end of key 56 to the position shown in Fig. XIV will, by forcing down rod 55, depress the arm 54 rocking the shaft 53 and swinging the upper end of levers 52 forward. This movement also brings forward the rail 5 and the paper carriage so as to bring the platen to a different line of type on the type carriers from that normally used. The depression of the front end of the rocking key 56 by lifting the arm 54 above its normal position and throwing the lever 52 and paper carriages back will bring still another line of type into action. A counteracting spring 58 (see Figs. XI and XV) wound around the rock shaft 53 and having its free ends projecting on opposite sides of a stud 59 of arm 54 and a stud 60 on a fixed lug 61 of the stationary frame, serves to return said arm 54 (after depression of key 56) to its normal horizontal position and so maintain the platen as to bring the central line of type into action—for either the elevation or depression of the arm 54, carrying with it the stud 59, will bend one end of spring 58 while the other end is arrested by the fixed stud 60. In its extreme position the key 56 is arrested and prevented from falling back by a rocking cam 62 pivoted at 63 to a downward extending projection 64 of the key 56 and engaging with one side or the other of a fixed teat 65 on the base frame. Stops 54$^a$, 54$^b$ limit the upward and downward movements of arm 54.

It is desirable that when the rocking key 56 is released and the carriage is thrown back to its normal position by the spring 56 it shall be positively arrested and locked there without vibrating over its pivots but the lock must be of such nature that it will be automatically removed by the operation of the key 56, in other words, it is desirable to be able to shift the carriage from front to rear by means of the key 56 and yet to have the carriage so locked that it cannot be vibrated by its own momentum or by force directly applied to it. To accomplish these results I extend the arm 54 forward of the connection of link 55 and provide on its forward end a pin or stud 66. I also extend downward the arm 64 of rocking key 56 and provide at its lower end two pins 67 which when said arm is in vertical position are immediately above and below the pin 66 on arm 54 (see Figs. XIII and XXIII in which the mechanism is viewed from different sides). The adjacent faces of the pins 66, 67 are flattened as shown in Fig. XI in dotted lines. The connection of link 55 to the arm 54 is by pin 68 and slot 69 (see Fig. XII.) The result is that when either end of the rocking key 56 is depressed the loose motion at 68, 69 will allow the pins 67 to clear the pin 66 before the arm 54 is moved and yet when the arm 54 returns to its normal horizontal position it is immediately locked by the engagement of the said pins and prevented from being operated by the momentum of the paper carriage or by force applied thereto. The purpose of this construction is to supplement the return spring 58 by a positive lock or stop so that when in rapid writing with quick release of the shifting key, the return spring throws the platen or carriage toward the normal central position, the platen will be positively or rigidly arrested as it arrives at the central position and so prevented from passing beyond, as it would if only opposed by the yielding action of the return spring. A returning spring 70 similar in construction and arrangement to the spring 58 is wound on the stud 59 and its ends engage on opposite sides of the pin 68 and a stud 71 on arm 54 so as to keep the pin 68 normally in the middle of slot 69.

It is desirable that the point of impression of the type on the surface of the platen be at all times in the same vertical plane as the trunnions of the platen so that the whole face of the type may print evenly and the blow shall not tend to revolve the platen. I therefore maintain the paper carriage perfectly level notwithstanding the swinging action of its supporting levers 52, 52. It is for this purpose that the rail 5 is, as already explained, pivoted on the levers 52 at their upper ends.

Referring now to Figs. IV and XI, it will be seen that one of the levers 52 is slotted at 72 and that the lower edge of rail 5 has a pin 73 projecting through the slot. 74 is a lever, pivoted at 75 on the lever 52, and having open ended slots engaging with the pin 73 on rail 5 and with a pin 76 on the stationary post 3. A spring 77 fulcrumed on the pin 76 and bearing against pivot 75 and pin 73 takes up all back lash on the pivots, whether arising from wear, looseness of joints or other cause. Supposing the lever 72 to be swung forward on the depression of key 56, it will bring with it the rail 5 and the paper carriage supported thereon but the upper end of the lever 74 being arrested by pin 76, the lower end of said lever, acting on pin 73, will slightly turn the rail on its bearings on the levers 52 keeping the carriage in horizontal position.

The escapement mechanism for allowing the carriage to be fed from right to left step-by-step under the influence of the coiled spring in box 49 will next be described. 78 is a short rack carried by a curved arm 79 pivoted at 80, 80 to the rail 5. 81 is another short rack having pin and slot connection 82, 82 with the short rack 78 and having a spring 83 which tends constantly to force the rack 81 to the right. As the arm 79 is vibrated over its pivots, the racks 78 and 81 are brought alternately in connection with the long rack 24 allowing the same together with the paper carriage to be fed forward step-by-step in a well-known manner.

It is important that the connection of the arm 79 to the feed bar be such as to remain unaltered when the carriage is shifted from front to rear in changing the line of type brought into operation. To this end I employ the following mechanism: 84 (see Figs. II, XIX and XX) is the feed or spacer bar of flattened-U shape having its arms pivoted to the stationary parts of the machine for instance, on one side to the base frame and on the other side to the pendent lug 61 already referred to. A stop 85 (Fig. XV) on this lug may arrest the upward movement of the spacer bar. The spacer bar is hung from the arm 79 of the short vibrating feed rack by pin 86 and spiral spring 87 while between the two members is placed as a spreader or push rod a short bar 88. This bar has a flaring slot at its lower end whereby it may seat on and oscillate over the spacer bar and its upper end is connected to the arm 79 by a teat 89 which projects loosely through a hole in said arm. The upper end of bar 88 is made segmental, with a radius struck from its point of contact with spacer bar 84, so that as the bar 88 oscillates on bar 84 the distance between the bar 84 and the arm 79 will remain constant. The several key levers 90 with spacer key levers 91 are ranged in a bank pivoted on a transverse bar 92 and arranged over the spacer bar 84. A depression of any one of these keys will cause the depression of the spacer bar 84 and as the bar 88 falls with it, the spring 87 can draw down the arm 79 keeping it in contact with the top of bar 88 until the rack 81 is dislodged from the long feed rack and the rack 78 engaged therewith. By an inspection of Fig. II, it will be seen that this action has expanded the spring 87 inasmuch as the part of the arm 79 to which it is attached does not fall as rapidly as the end of the arm 86. When therefore the key which has been depressed is released, the contraction of the spring 87 will raise the arm 86 and with it the spacer bar 84 and the arm 79, fulcruming them about the bar 88. The two pivoted members or levers 79 and 84, 86, with the link or bar 88 and the spring 87 all move up together as said levers turn on their pivots and in this way the return movement of the short feed racks is effected, bringing the sliding rack 81 again into engagement with the long rack so as to allow the carriage to feed forward the width of one letter or space. The key levers are flat bars whose front ends are guided through a face plate 93 forming the key board. The face plate has slots 94 but slightly wider than the keys, to receive and guide them. Friction is lessened at those points by making the ends of the slots slightly wider than their center so that the keys can twist slightly without binding. Another guide consisting of a vertically slotted transverse bar is provided at 95 (see Figs. II and IV). The guide 95 serves to hold the levers vertical and keep them properly spaced on the pivot rod 92 on which they are slipped loosely. Those key levers which operate the front bank of type carriers terminate at the guide 95 while those which operate the rear bank run through to the rear end of the machine as shown in Fig. II. The type carrier is shown in perspective in Fig. XVII. It consists in a rod 96 (which carries a type block 97) and a U-shaped bar 98. This bar 98 is formed of a flat piece bent up into U-shape as shown and having one end bent around the rod 96 so as to hold it firmly. Upon the bar are lugs 99 to which are hinged the upper end of links 100 and levers 101. These links and levers are hinged respectively to the upper segmental frames 4 and the base frame 1 by means shown in Figs. II and XVI. The circular parts of the said frames have radiating grooves 102 and a curved groove 103 cutting through the first named grooves. The links and levers being dropped into the said grooves 102 a wire or rod 104 bent to the proper shape is run through them all and is then locked in position in the groove 103 by keys 105. The levers 101 are of considerably greater length than the links 100 as shown so that when the lever is thrown forward to the projected position shown in Fig. II, the type block 97 will describe a sharp curve and come down on the platen almost vertically, the rear end of the type carrier traveling meanwhile in a nearly straight line.

The method of forming the type bar of a piece of flat metal bent up in U-shape is advantageous not only on account of its lightness convenience and cheapness but because it allows the link 100 to enter the U bar slightly when the type carrier is projected as shown in Fig. II thus enabling the link to be crooked as shown to clear the type blocks of adjoining bars. The long key levers 90 have near their rear ends push rods 106 and beyond them spiral springs 107 both united to the arms 108 of levers 101. When therefore the rear end of said key levers is raised by the depression of a key and the arm 108 is lifted by rod 106 to project the type into operating position, the spring 107 is expanded because the arm 108 will move through a greater arc than the rear end of the key lever and will restore the parts to normal position by contraction on the release of the key. The short key levers are connected with the arms 108 of the forward bank of levers 101 by rods or spreaders 109 and, in front of the latter, spiral springs 110. The relative distances of the connections from the fulcra 92 and 104 are so proportioned that on the depression of a short key lever the spring 110 is expanded and on release of the key lever it will restore the parts to normal position. The spacer key lever is raised by a separate and independent spring 111. Each type block 97 has three characters, the faces of which rest in the normal position on an ink pad 112 supported in a curved pan 113 which is pivoted at each end, at 114, 114, to the segments 4. The blocks rest in parallel series on the pad and the type carriers radiate therefrom, as shown in Fig. I, and are so hung on their supporting links and levers that when projected as shown, they will all strike a common point over the platen. Guides 115 and 116 are provided for the type carriers. The main body 112 of the ink pad is made of felt or similar porous material capable of taking up a great quantity of ink preferably divided into a number of sections as shown in Fig. XVIII, each section braced or strengthened by a curved metal backing 112$^a$, and the top of the pad is faced with a thin layer of skin or leather 112$^b$. I find this combination exceedingly efficacious, the leather being just sufficiently porous to allow the right quantity of ink to pass through for inking the faces of the type.

In most of the machines on the market at the present day there is nothing to arrest the action of the keys when the end of a line is reached and the operator may, if not careful, strike one character over another on the same spot, causing a mark which is difficult of erasure. To avoid this I employ a lock which will positively arrest the movement of the keys when the carriage is at or near the end of its movement. Figs. XIX and XX, show one form of the lock. As here shown, the universal space bar 84 has a finger 118. 119 is a sleeve or rotary member supported on a fixed pin or projection 120 from the main frame. This member has a hook 121 which is normally turned up by a spring 122 out of the path which the pin 118 will take on the descent of the space bar 84. The said member also has an arm 123 which is adapted to be struck by a projection 124 from the paper carriage. This projection is so located as to come in contact with the arm 123 when the carriage has reached the end or nearly the end of its movement, and when the impact takes place the hook 121 is thrown down into the position shown in Fig. XIX, where it will arrest the pin 118 and space bar 84 and so prevent the depression of the key. Preferably this action takes place at one step before the end of the carriage movement so that by touching the rocking key 56 and thereby oscillating the paper carriage, the parts 123 and 124 will be disconnected, and then the spring 122 will force the hook 121 from engagement with pin 118 and allow the depression of a key to make one additional letter on the line. This is especially desirable where the addition of a single character such as for instance a period or a hyphen will complete a word or a syllable.

Having thus described my invention, the following is what I claim as new therein and desire to secure by Letters Patent:

1. In a typewriting machine, the combination of a base frame, the upper segmental frames supported therefrom, the series of type carriers supported on said upper segmental frames and the links and levers carrying and operating said type carriers, the links pivoted on the upper segmental frame and the levers on the base frame, substantially as and for the purposes set forth.

2. The combination of a typewriter frame having radiating slots 102 and arcuate groove 103 traversing the slots 102, and opening on one side of said frame the type carrier operating levers or links arranged in said slots 102 and the pivot rods 104 common to said levers and retained within the said groove 103.

3. In a typewriting machine, the combination of a rotating platen, its carriage, the lever 13 pivoted at the left hand end of said carriage and having arm 15, the rod or link 16, the yoke 17, the ratchet wheel 12 and spring pressed pawl 18.

4. The combination of the rotating platen 10, its carriage, the lever 13 pivoted on said carriage and moving in a plane parallel therewith, the arm 15 on said lever having finger 28, the step-by-step feed rack 24 pivoted on said carriage and the arm 25 on said rack projecting in the path of the finger 28, substantially as and for the purposes set forth.

5. The combination of the paper carriage having a rotary platen, ratchet wheel and pawl for operating the same and an L lever hinged to said carriage having a vertical arm 13 adapted to oscillate to and from the platen and a horizontal arm 15, connected to said pawl, a feed rack and connections between lever 13 and said rack for moving the latter by the former, substantially as set forth.

6. The combination of the paper carriage, the lever 13 pivoted at the left hand end of said carriage and moving in a plane transverse of the machine, the arm 15 in said lever, the step-by-step feed rack pivoted on said carriage and having the arm 25 projecting in position to be operated on the movement of said lever to swing the feed rack laterally substantially as set forth.

7. The combination of the paper carriage, the rotary platen mounted thereon, thumb piece 30 pivoted on the right hand trunnion of said platen and having stop 31 and long feed rack 24 swiveled on said carriage and having arm 26 projecting in the path of said thumb piece whereby the step-by-step feed may be detached without rotating the platen, substantially as set forth.

8. The combination of a paper carriage, step-by-step feed mechanism therefor, means for releasing the action of said step-by-step mechanism while the carriage is being thrown to the right, and a lock or catch thrown into engagement automatically when the carriage is thrown to the right and holding said carriage from reverse movement for the instant after the release of the carriage by the operator before the engagement of the feed mechanism, substantially as set forth.

9. The combination of a paper carriage, a step-by-step escapement, a fixed toothed bar 6, $6^a$, locking pawl $8^a$ carried by said carriage and having arm $8^b$ and spring $8^d$ and lever 13 having arm 15 and stop $8^c$ arranged and adapted to operate substantially as set forth.

10. The combination of the paper carriage, its support, the rack-bar $45^c$ and the stop $45^a$ having a spring pawl for locking it in desired position on said bar for arresting the paper carriage, substantially as set forth.

11. The combination of the single rail or track, paper carriage mounted thereon, the pendent arm from said carriage and two part telescopic spring pressed wheel carried by the lower end of said arm and running on the under edge of said girder or track; substantially as set forth.

12. The combination of the single rail or girder, the paper carriage thereon, the steadying arm and the two part beveled spring pressed wheels on said arm bearing under said rail; substantially as set forth.

13. The combination of the platen or paper carriage, oscillating arms or levers whereon the same is mounted and sustained and means for maintaining the said carriage horizontal whatever the position of said oscillating levers.

14. The combination of oscillating arms or levers and a paper carriage supported thereon and arranged to oscillate therewith and relatively thereto.

15. The combination of a paper carriage and oscillating levers having round or segmental upper ends whereon the carriage is mounted and whereby it is maintained in a horizontal plane.

16. The combination of a paper carriage, oscillating standards or levers whereon said carriage is mounted, sustained and pivoted, means for oscillating said levers and a second lever fulcrumed on one of said standards and on the stationary frame and connected to the paper carriage so as to oscillate the same relatively to the said standards; substantially as set forth.

17. The combination of the platen or paper carriage, a track therefor, oscillating standards whereon said track is pivoted, and means for shifting said platen or paper carriage, substantially as set forth.

18. The combination of a single track or girder, a paper carriage adapted to run thereon, transverse of a type-writing machine, oscillating standards whereon said girder or track is pivoted and means for oscillating said standards, substantially as set forth.

19. The combination of the track or girder 5, paper carriage mounted thereon, the standards 52 whereon said track or girder is mounted, means for oscillating said standards, parallelizing lever 74 pivoted on the stationary frame on one of said standards and on the girder 5, substantially as and for the purposes set forth.

20. The combination of paper carriage carrying a track or girder 5, standards 52 whereon the same is pivoted, lever 74 fulcrumed as described and spring 77 arranged and adapted to operate, substantially as set forth.

21. The combination of an oscillating paper carriage, vertical arms or standards supporting said carriage, an arm 54 connected to said vertical arms or standards, an operating key and a link or connecting rod 55 between said arm 54 and key, substantially as set forth.

22. The combination of an oscillating paper carriage, a rocking key for operating the same, the stationary frame having stop 65 and the stop cam 62 carried by the said rocking key, substantially as set forth.

23. The combination of a platen carriage having movement in opposite directions from a normal central position with a rigid or positive lock adapted to arrest the carriage on its return to central position from vibration in either direction, substantially as set forth.

24. In combination with a platen or paper carriage adapted to be shifted both ways from a normal central position, a shifting arm or lever therefor, a spring adapted to return the carriage to its normal position, and a positive lock for arresting it in said position, substantially as set forth.

25. The combination of a paper carriage, an arm or lever for shifting the same, a lock which automatically engages said arm or lever in its normal position and locks it and the carriage from movement in both directions, and a key connected to said arm or lever and to said lock and automatically unlocking said arm or lever when moved to shift the carriage, substantially as set forth.

26. The combination of an oscillating paper carriage its operating arm 54 having arm 64 and the rocking key 56 provided with pins 67 and means for operating said arm 54 from said rocking key.

27. The combination of an oscillating paper carriage, its operating arm 54 and the key 56 having arm 64 provided with pins 67 and means for operating said arm 54 from said key.

28. The combination of the paper carriage, arm or lever 54, rocking key 56, connecting rod 55 having loose connection with said arm 54 and a lock for said arm which is detached by the key 56 during the take up of loose motion of the connecting rod 55, substantially as set forth.

29. The combination of the paper carriage, oscillating arm 54, the rocking key 56 having means for locking and unlocking said arm 54, the connecting rod 55 having loose connection with said arm 54 and returning spring 70 adapted to keep the said connecting rod midway of its loose motion, substantially as set forth.

30. The combination of the step-by-step escapement operating arm, the universal spacer bar, a spreader or bar arranged between said arm and spacer bar and a spring also arranged between the said two members, substantially as and for the purposes set forth.

31. The combination of two pivoted levers projecting from their fulcra toward and past each other connected by a link or bar and a spring which acts to convert the link pivots into floating fulcra and tends to move the levers and link or bar together in one direction.

32. The combination of two pivoted or fulcrumed bars, arms or members projecting toward each other from their fulcra and connected by a tensile spring and a thrust bar or spreader arranged so as to operate, substantially as described.

33. The combination of the escapement operating arm 79, spring 87 hung therefrom, the universal spacer bar hung from said spring and the thrust bar or spreader arranged to oscillate on said universal spacer bar and having a segmental upper end whereon said arm 79 rests, substantially as and for the purposes set forth.

34. The combination of the paper carriage, the long feed rack thereon, two laterally movable short feed racks, one sliding on the other arranged to co-act with said long feed rack, the bent arm 79 carrying said short feed racks bent forward in direction across the plane of said racks and pivoted to the paper carriage support and means connected with the key levers for operating the said bent arm, to move said short racks laterally substantially as set forth.

35. The combination of the type carrier operating levers 101 having arms 108, the long key levers 90, the tensile springs 110 whereby said key levers are hung from said arms and thrust rods or spreaders 109 between said arms 108 and key levers 90 all arranged and adapted to operate, substantially as set forth.

36. The combination of the series of key levers 90, 91, the round pivot bar 92, the slotted guide plate 95 for spacing said key levers and the stationary frame whereon the same are mounted.

37. The face plate or key board having key-lever guide slots larger at their ends than at their midway, substantially as and for the purposes set forth.

38. The combination of U-shaped type carriers 98 and the bent carrying links 100 therefor.

39. The combination of a series of parallel type blocks and an ink pad therefor made up of a number of parallel sections.

40. The ink pad made up of a series of parallel sections rounded on their under surface in combination with a flat bottomed pan adapted to contain said sections, substantially as set forth.

41. The combination of the ink pad made up of a series of parallel sections supported on metal seats or springs.

42. The combination of a pivoted paper pressure bar and a pivoted index adapted to be thrown out of position by said paper pressure bar.

43. The combination of a paper carriage having an arm or stop with a toothed bar, a stop carried thereby and arranged to turn thereon and to slide on said bar, and with means for holding said stop on said rod, substantially as described.

44. The combination of a paper carriage having an arm or stop 45, with a toothed bar, a sleeve adapted to slide thereon, a stop 45$^a$ on said sleeve, and a spring bolt or pin carried by said sleeve, to engage said toothed bar, substantially as described.

45. The combination with the key levers and the vibrating traveling paper carriage, of a locking bar arranged transversely of said key levers and normally in reach of said key levers, and means for holding said locking bar to prevent depression of the key levers, said holding means being arranged to release said bar upon the vibration of said carriage, substantially as described.

46. The combination with the key levers and the vibrating traveling paper carriage, of a universal space bar arranged to be depressed by the key levers, and means carried by the vibratory portion of said carriage for locking said spacer bar to prevent depression of the key levers, and releasing said spacer bar upon the lateral movement of said carriage, substantially as described.

47. The combination with the key levers and the traveling paper carriage of a universal spacer bar, means for locking said spacer bar to prevent its depression by the key levers, and means connected with the paper carriage for actuating said locking device to lock the spacer bar, and for releasing the latter while near the end of a line to permit the insertion of an additional letter, substantially as described.

48. The combination with the key levers and the traveling paper carriage, of a pivoted universal spacer bar, a finger or projection extending from said spacer bar on the side opposite its pivot, a hook for engaging said finger to prevent depression of the spacer bar, and means connected with the paper carriage for actuating said hook, as and for the purpose specified.

49. The combination with the key levers and the traveling paper carriage of a universal spacer bar, a finger or projection carried thereby, a rod 120 carried by the main frame a rotary sleeve or member journaled on said rod, and a hook carried thereby to engage said finger or projection, and a projection on the paper carriage to actuate said sleeve or hook, as and for the purposes specified.

J. N. WILLIAMS.

Witnesses:
HARRY E. KNIGHT,
MAZIE V. BIDGOOD.